United States Patent
Lu et al.

(10) Patent No.: US 12,199,327 B2
(45) Date of Patent: Jan. 14, 2025

(54) POWER DIVIDER AND BASE STATION ANTENNA

(71) Applicant: Outdoor Wireless Networks LLC, Claremont, NC (US)

(72) Inventors: Jianpeng Lu, Suzhou (CN); Changfu Chen, Suzhou (CN); Fei Li, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 301 days.

(21) Appl. No.: 17/813,705

(22) Filed: Jul. 20, 2022

(65) Prior Publication Data

US 2023/0059701 A1  Feb. 23, 2023

(30) Foreign Application Priority Data

Aug. 20, 2021 (CN) .......................... 202110958676.1

(51) Int. Cl.
*H01P 5/16* (2006.01)
*H01P 3/08* (2006.01)
*H04B 1/04* (2006.01)

(52) U.S. Cl.
CPC ............... *H01P 5/16* (2013.01); *H01P 3/08* (2013.01); *H04B 1/04* (2013.01)

(58) Field of Classification Search
CPC ............. H01P 5/16; H01P 3/08; H04B 1/04
See application file for complete search history.

(56) References Cited

U.S. PATENT DOCUMENTS

| | | | | |
|---|---|---|---|---|
| 7,324,060 B2 * | 1/2008 | Quan | ..................... | H01P 5/16 333/128 |
| 7,595,753 B2 * | 9/2009 | Ratni | ................... | H01Q 3/2617 342/372 |
| 8,462,063 B2 * | 6/2013 | Gummalla | ............. | H01Q 1/243 343/745 |
| 10,084,224 B2 * | 9/2018 | Srirattana | ............... | H01P 5/184 |
| 10,461,390 B2 * | 10/2019 | Zhou | ....................... | H01P 1/184 |
| 2018/0248257 A1 * | 8/2018 | Thotahewa | ........... | H01Q 1/521 |
| 2020/0220252 A1 * | 7/2020 | Xiao | ...................... | H01Q 21/26 |

FOREIGN PATENT DOCUMENTS

| | | | | |
|---|---|---|---|---|
| CN | 202474214 U | * | 10/2012 | ............. H01Q 3/32 |
| CN | 102544733 B | * | 4/2014 | |
| CN | 109167142 A | * | 1/2019 | ............. H01P 5/16 |
| CN | 110459869 A | | 11/2019 | |
| CN | 110707407 A | * | 1/2020 | ............. H01P 5/16 |
| CN | 210142726 U | * | 3/2020 | ............ H01Q 23/00 |
| CN | 212874764 U | * | 4/2021 | ............. H01Q 1/52 |

* cited by examiner

*Primary Examiner* — Andrea Lindgren Baltzell
*Assistant Examiner* — Timothy F. Bardo
(74) *Attorney, Agent, or Firm* — Myers Bigel, P.A.

(57) ABSTRACT

A power divider includes: a dielectric substrate; a transmission line circuit on a first surface of the dielectric substrate, the transmission line circuit including an input trace, a first output trace and a second output trace. The transmission line circuit is configured to split a signal received at the input trace into a first sub-component that is output on the first output trace and a second sub-component that is output on the second output trace; and a reference potential layer, set on a second surface opposite the first surface of the dielectric substrate, where the reference potential layer is provided with a decoupling window that exposes a part of the dielectric substrate to reduce coupling in the transmission line circuit.

20 Claims, 5 Drawing Sheets

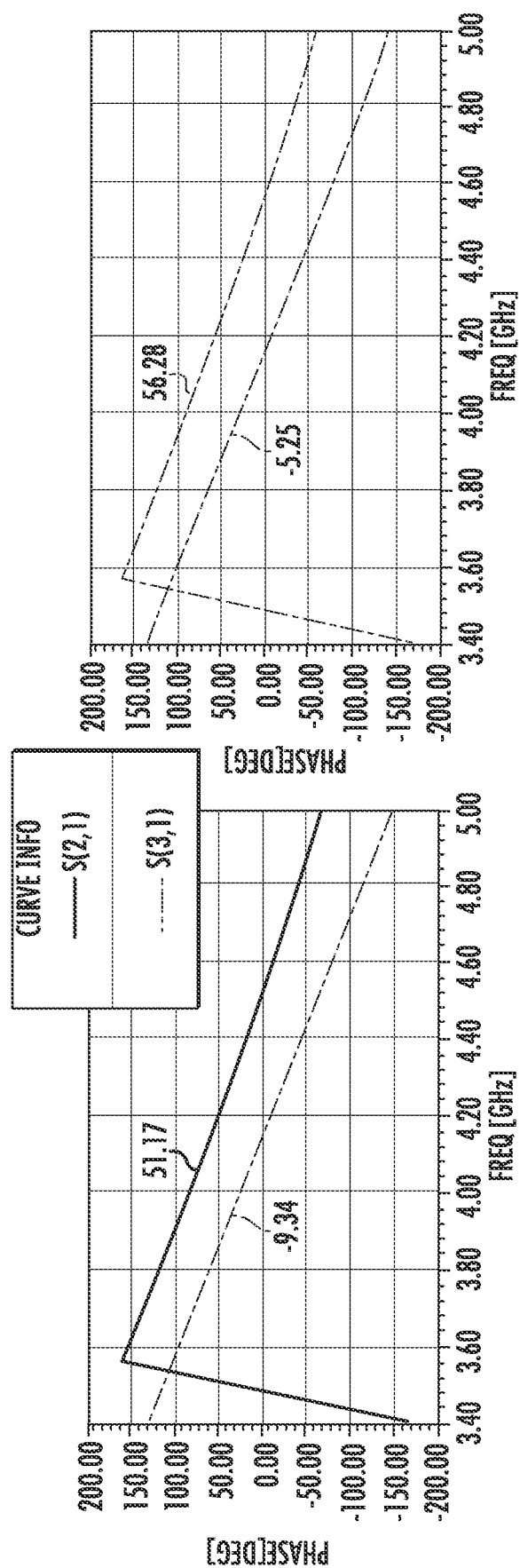

POWER DIVIDER AND BASE STATION ANTENNA

CROSS-REFERENCE TO RELATED APPLICATION

The present application claims priority to Chinese Patent Application No. 202110958676.1, filed Aug. 20, 2021, the entire content of which is incorporated herein by reference as if set forth fully herein.

FIELD

The present disclosure relates generally to the technical field of radio communication, and more particularly, to a power divider and a base station antenna.

BACKGROUND

Power dividers are devices that include an input that is configured to receive an input signal and a plurality of outputs. Signals received at the input are divided into a plurality of sub-components that are output on the respective outputs. Power dividers are widely used in various devices such as, for example, on base station antennas (for example, beamforming base station antennas). In some power dividers, the inputs and outputs may be implemented as transmission line traces. Adjacent transmission line traces may have relatively strong coupling, which causes the ratio of signal energy produced to be inconsistent with the desired ratio. Therefore, there is a need for a new power divider.

SUMMARY

According to a first aspect of the present disclosure, a power divider is provided, and the power divider includes: a dielectric substrate; a transmission line circuit, set on a first surface of the dielectric substrate and the transmission line circuit includes an input trace, a first output trace and a second output trace, where the transmission line circuit is configured to split a signal received at the input trace into a first sub-component that is output on the first output trace and a second sub-component that is output on the second output trace; and a reference potential layer, set on a second surface opposite the first surface of the dielectric substrate, where the reference potential layer is provided with a decoupling window that exposes a part of the dielectric substrate to reduce coupling in the transmission line circuit.

According to a second aspect of the present disclosure, a base station antenna is provided, and the base station antenna includes the power divider as described above.

BRIEF DESCRIPTION OF THE DRAWING

FIG. 6(a) shows schematically phase difference between two paths of output signals in a power divider without a decoupling window.

FIG. 6(b) shows schematically phase difference between two paths of output signal in the power divider as shown in FIG. 1 to FIG. 3.

Dotted lines are used in some of the figures to depict parts located on the rear surface on the dielectric substrate. In the embodiments described below, under some circumstances, the same signs are used among different drawings to indicate the same parts or parts with the similar functions, and repeated description is thus omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the positions, dimensions, and ranges disclosed in the attached drawings and the like.

DETAILED DESCRIPTION

Various exemplary embodiments of the present disclosure will be described in detail below by referencing the attached drawings. It should be noted: unless otherwise specifically stated, the relative arrangement, numerical expressions and numerical values of components and steps set forth in these embodiments do not limit the scope of the present disclosure.

The following description of at least one exemplary embodiment is actually only illustrative, and in no way serves as any limitation to the present disclosure and its application or use. In other words, the structure and method herein are shown in an exemplary manner to illustrate different embodiments of the structure and method in the present disclosure. Those of ordinary skill in the art should understand that these examples are merely illustrative, but not in an exhaustive manner, to indicate the embodiments of the present disclosure. In addition, the drawings are not necessarily drawn to scale, and some features may be enlarged to show details of some specific components.

The technologies, methods, and equipment known to those of ordinary skill in the art may not be discussed in detail, but where appropriate, the technologies, methods, and equipment should be regarded as part of the specification.

In all examples shown and discussed herein, any specific value should be construed as merely exemplary value and not as limitative value. Therefore, other examples of the exemplary embodiment may have different values.

Figure 1:
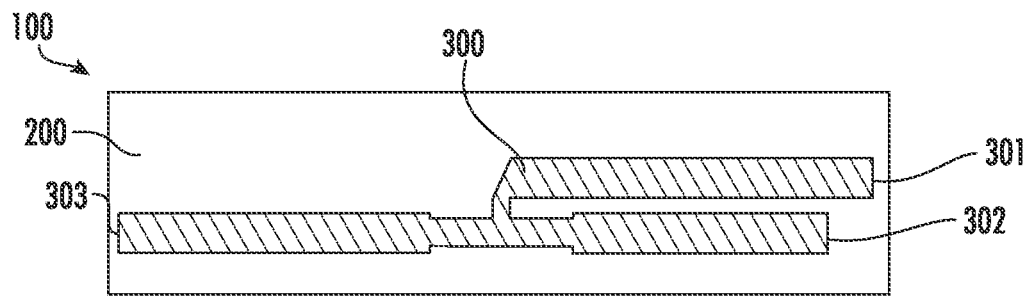
FIG. 1 shows schematically a front view of a power divider according to an exemplary embodiment of the present disclosure.
Figure 2:
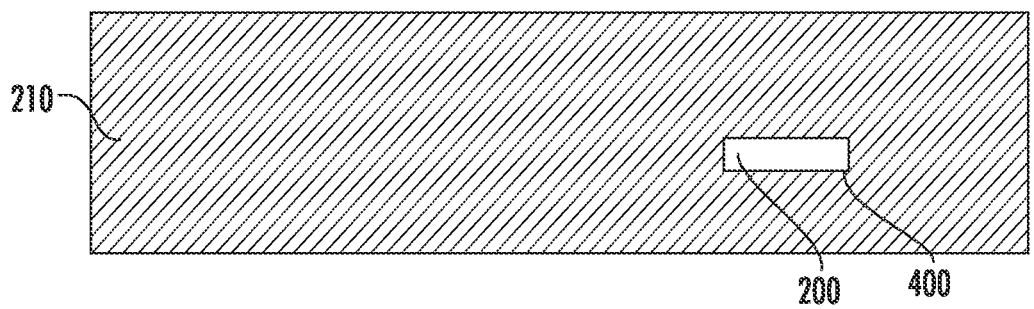
FIG. 2 shows schematically a rear view of a power divider according to an exemplary embodiment of the present disclosure.
Figure 3:
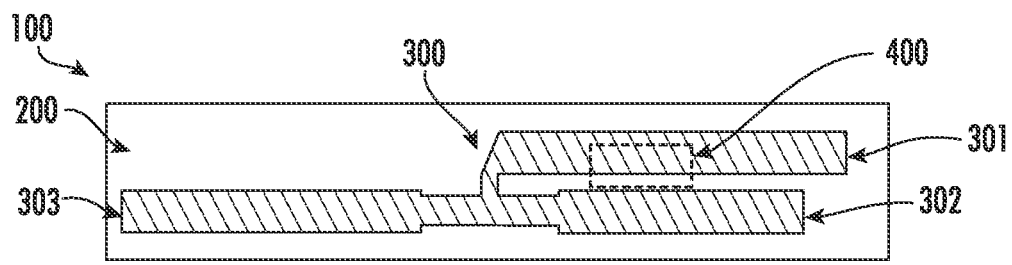
FIG. 3 shows schematically a shadow front view of a power divider according to an exemplary embodiment of the present disclosure.

FIG. 1 to FIG. 3 show a front view, a rear view and a shadow front view of a power divider 100 according to an exemplary embodiment of the present disclosure, where the power divider 100 may include a dielectric substrate 200, a transmission line circuit 300 set on a first surface of the dielectric substrate 200 and a reference potential layer 210 (for example a ground layer) set on a second surface opposite the first surface of the dielectric substrate 200. The transmission line circuit 300 and reference potential layer 210 may be made of metal to form signal pathways and the transmission line circuit 300 and reference potential layer 210 are electrically isolated from each other by the dielectric substrate 200.

In specific embodiments as shown in FIG. 1 to FIG. 3, the transmission line circuit 300 may include a plurality of traces connected to each other, for example, a first trace 301, a second trace 302 and a third trace 303. One of the traces among the first trace 301, second trace 302 and third trace 303 may be used as an input trace to receive input signals and the other two traces may be used as output traces to produce output signals. For example, the first trace 301 may be an input trace, and the second trace 302 and third trace 303 may be output traces. Alternatively, the second trace 302 may be an input trace, and the first trace 301 and third trace 303 may be output traces. Or alternatively, the third trace 303 may be an input trace, and the first trace 301 and second trace 302 may be output traces. It can be understood that in some other embodiments, the transmission line circuit 300 may further include more traces to produce more paths of output signals based on the input signals, which are not limited here.

In order to reduce the space occupied by the power divider to reduce costs, the area of the dielectric substrate 200 is limited. Accordingly, on the first surface of the dielectric substrate 200, the settings in the transmission line circuit 300 will also be subject to certain limitations.

For example, in the transmission line circuit 300, at least two traces may be set parallel to each other to reduce the required wiring space. In addition, at least two traces may be set on the same straight line to reduce the space required by the transmission line circuit 300 in a direction perpendicular to the straight line. However, a relatively small distance between the traces may cause relatively strong coupling between signals transmitted through the traces, which may change the power ratio of the signals passing along the two (or more) traces. In addition, coupling between traces may also degrade other performance parameters such as, for example, the return loss of the power divider 100, thereby causing less than ideal performance of the power divider 100.

In order to resolve the above-described issue, as shown in FIG. 2, the reference potential layer 210 of the power divider 100 may include a decoupling window 400 where the metal of the reference potential layer 210 is removed to expose a part of the dielectric substrate 200. The decoupling window 400 reduces coupling between traces in the transmission line circuit 300. By providing the reference potential layer 210 with the decoupling window 400 on the second surface of the dielectric substrate 200, coupling in the transmission line circuit 300 may be weakened to improve the performance of the power divider 100 without having to change the trace distribution in the transmission line circuit 300 on the first surface of the dielectric substrate 100.

In the transmission line circuit 300, relatively strong coupling between adjacent traces is usually capacitive. Therefore, in order to compensate the effect of capacitive coupling, the decoupling window 400 may be inductive. By changing the number of decoupling windows 400, their positions relative to the transmission line circuit 300, their shapes, sizes and/or other parameters, the inductive effect of the decoupling window 400 may be adjusted, thereby improving the degree of compensation provided by the capacitive coupling.

Specifically, coupling between traces will cause the power ratio of output signals of the power divider to have undesirable changes. For example, in a usual power divider, the desired power ratio of an output two-path signal is 1:1, that is, the power divider 100 is capable of equally dividing the power of input signals. However, if there is relatively strong coupling between traces, the eventual power ratio of output signals may not be equal to 1:1. Therefore, by setting the decoupling window 400 with suitable parameters, the power ratio between output signals is capable of meeting the requirements. It can be understood that in some other embodiments, the desired power ratio of signals output by the power divider 100 may not be 1. Similarly, the desired power ratio may be obtained by adjusting the parameters of the decoupling window 400, which is not limited here.

In some embodiments, the quantity, position, shape, size and other parameters of the decoupling window 400 may be pre-determined through simulation. For example, in the exemplary embodiment as shown in FIG. 3, the decoupling window 400 is rectangular and its longitudinal side may extend parallel to the extension direction of the first trace 301 and the second trace 302, which have relatively strong coupling. However, the present disclosure is not limited to this, and the decoupling window 400 may also be in other shapes, for example, a square, oval or strip-shaped.

In some embodiments, in order to improve the compensatory effect of the inductive decoupling window 400, the decoupling window 400 may be located near a part in the transmission line circuit 300 that has stronger coupling as compared to other parts. Specifically, as shown in FIG. 3, the decoupling window 400 may be located near the first trace 301 and second trace 302, which are parallel and relatively near to each other, for example, it may be set overlapping at least one of the first trace 301 or the second trace 302. Alternatively, the decoupling window 400 may be set to be located between the first trace 301 and second trace 302, which have relatively strong coupling. This way, the decoupling effects of a single decoupling window 400 should be maximized with as small or as few decoupling windows 400 as possible to realize the desired decoupling effects.

In some embodiments, the decoupling window 400 may be formed on the reference potential layer 210 of the power divider 100 during the manufacturing of the power divider 100. Alternatively, after the manufacturing of the power divider 100 is completed, in order to weaken the coupling of the transmission line circuit 300, a new decoupling window 400 may also be introduced to the reference potential layer 210 by etching or other operations, or the relevant parameters of the existing decoupling window 400 may be adjusted.

Figure 4A:
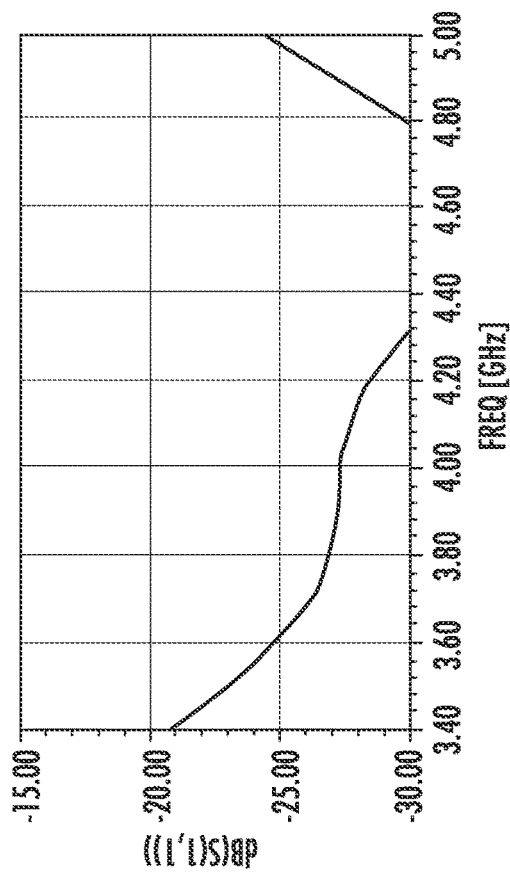
FIG. 4(a) shows schematically return loss in a power divider without a decoupling window.
Figure 4B:
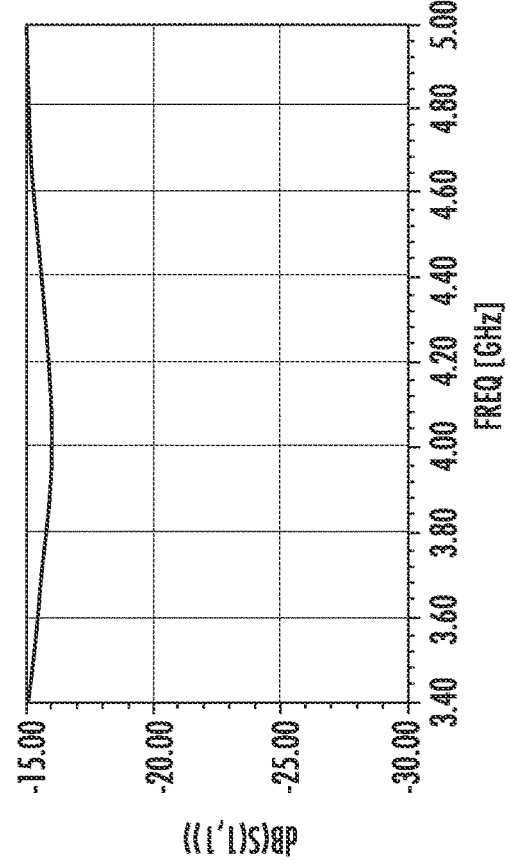
FIG. 4(b) shows schematically return loss in the power divider as shown in FIG. 1 to FIG. 3.

FIG. 4(*a*) to FIG. 6(*b*) show the results of a comparison of relevant parameters between a power divider without a decoupling window and the power divider with a decoupling window as shown in FIG. 1 to FIG. 3.

FIG. 4(*a*) and FIG. 4(*b*) show schematically return loss of a power divider without a decoupling window and return loss of a power divider with a decoupling window, respectively. It can be seen from comparing FIG. 4(*a*) and FIG. 4(*b*) that the power divider 100 according to the present disclosure is capable of improving return loss by at least 6 dB and even more than 15 dB.

Figures 5A, 5B:
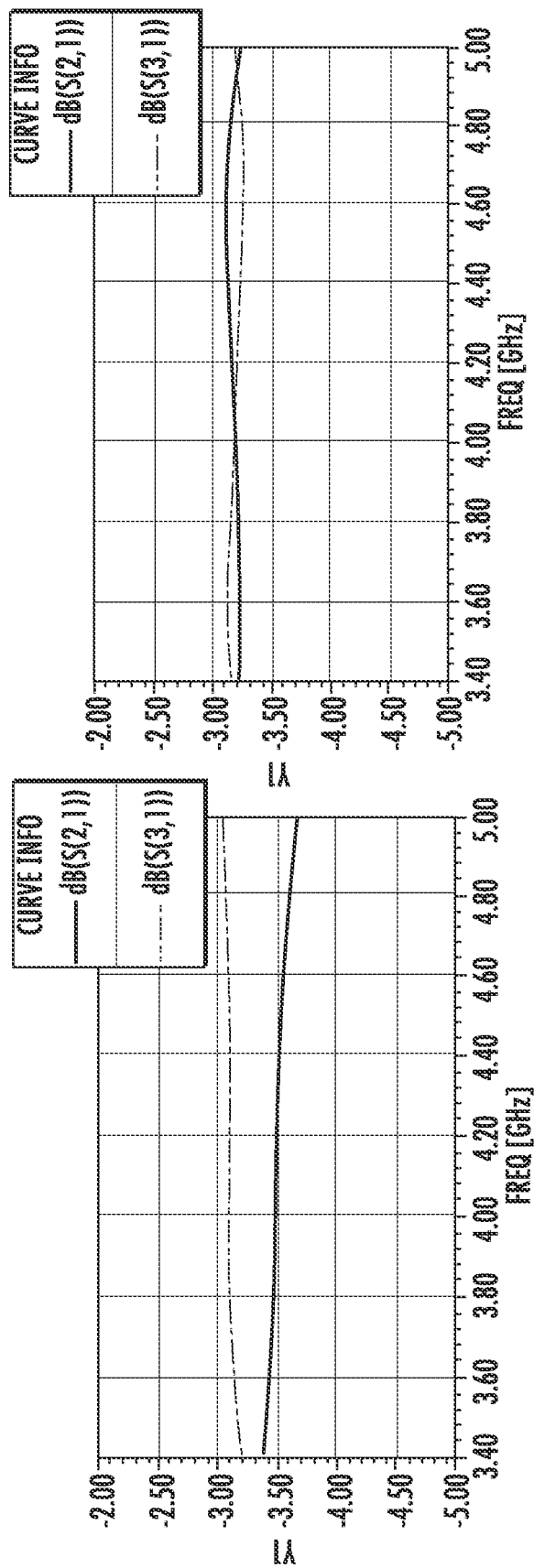
FIG. 5(a) shows schematically power division in a power divider without a decoupling window.
FIG. 5(b) shows schematically power division in the power divider as shown in FIG. 1 to FIG. 3.

FIG. 5(*a*) and FIG. 5(*b*) schematically show the power division ratio of a power divider without a decoupling window and the power division of a power divider with a decoupling window, respectively. In FIGS. 5(*a*) and 5(*b*), the darker line represents the power of the output signal on the second trace 302 relative to the power of the input signal on the first trace 301, and the lighter line represents the power of the output signal on the third trace 303 relative to the power of the input signal on the first trace 301. The desired ratio of a first output power of the first output signal to a second output power of the second output signal here is 1:1. It can be seen clearly in FIG. 5(b) that in the power divider 100 of the present disclosure, the difference between the first output power of the first output signal and the second output power of the second output signal is less than 0.2 dB. It can be seen from this that the power divider 100 with the decoupling window 400 according to the present disclosure is capable of realizing basically even output power division across a large frequency range.

FIG. 6(a) and FIG. 6(b) show a comparison of the phase difference between the first output signal and the second output signal before and after the power divider 100 is set with the decoupling window 400 according to the present disclosure, respectively, in which, the darker line represents the phase difference between the phase of the output signal of the second trace 302 and the phase of the input signal of the first trace 301 and the lighter line represents the phase difference between the phase of the output signal of the third trace 303 and the phase of the input signal of the first trace 301. It can be seen in FIG. 6(a) that the phase difference between the first output signal and the second output signal in the power divider without the decoupling window is approximately 60.51 dB. It can be seen in FIG. 6(b) that in the power divider 100 set with the decoupling window 400 according to an embodiment of the present disclosure, the phase difference between the first output signal and second output signal is approximately 61.53 dB. This shows that the provision of the decoupling window 400 has very limited effect, or basically no effect on the phase difference between the first output signal and the second output signal, so the phase difference in the output signals produced by the power divider is well maintained and not significantly affected by the decoupling window 400.

Figure 7:
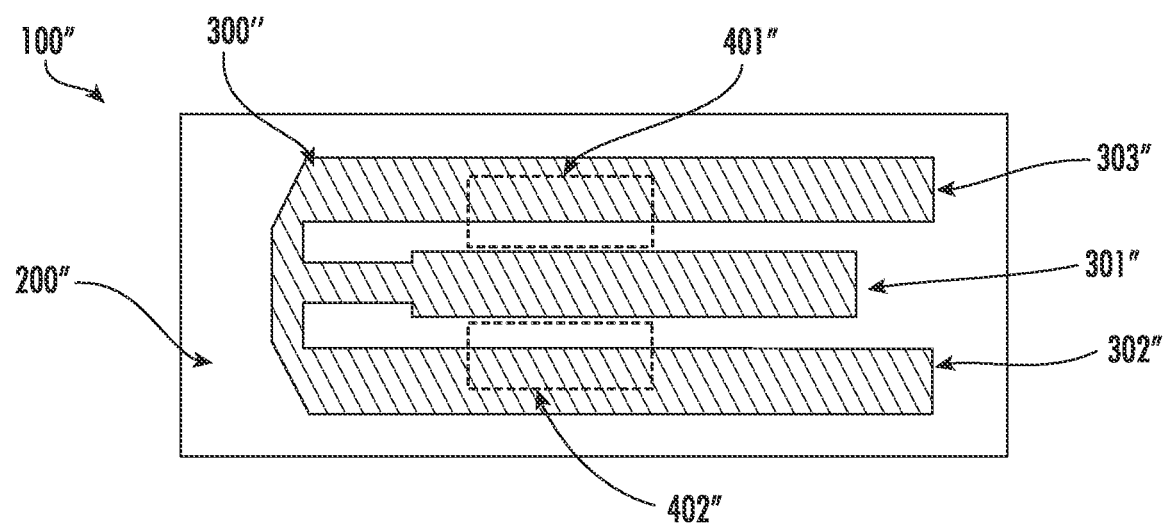
FIG. 7 shows schematically a shadow front view of a power divider according to another exemplary embodiment of the present disclosure.

In another exemplary embodiment of the present disclosure, the first trace 301", second trace 302" and third trace 303" in the transmission line circuit 300" may be parallel to each other. In order to ensure structural symmetry and keep the phase difference between the first output signal and second output signal the same, the first trace 301" located in the middle may be set as the input trace and the second trace 302" and third trace 303" located at the two sides may be set as the output traces. Moreover, the first output trace and second output trace may be symmetrical with respect to the input trace. In order to compensate for the effect of capacitive coupling between the input trace 301" and the first output trace 302" and between the input trace 301" and the second output trace 303", a first decoupling window 401" and a second decoupling window 402" may be provided in the reference potential layer of the transmission line circuit. The first decoupling window 401" may be formed in the region of the reference potential layer that is underneath the region between the input trace 301" and the first output trace 302" and the second decoupling window 402" may be formed in the region of the reference potential layer that is underneath the region between the input trace 301" and the second output trace 303", as shown in FIG. 7. In some embodiments, the two decoupling windows in the reference potential layer 210", that is, the first decoupling window 401" and the second decoupling window 402" may also be symmetrical with respect to the input trace.

The power divider according to the present disclosure may exhibit one or more of the following advantages: first, by providing the reference potential layer with the decoupling window to weaken the coupling in the transmission line circuit, a power divider with a desirable output power ratio may be realized; second, the provision of the decoupling window may improve return loss and other performance parameters of the power divider; third, the decoupling window has very little and even negligible effect on the phase difference of multi-path output power, so the phase difference of output signals may be kept stable; fourth, the provision of the decoupling window in the reference potential layer does not require changing the original wiring settings of traces in the transmission line circuit; fifth, some traces in the transmission line circuit are parallel to each other or located on the same straight line, thereby reducing the area of the dielectric substrate occupied by the transmission line circuit; sixth, the decoupling window does not occupy additional space, which is conducive to miniaturization of the power divider; seventh, the quantity, position, size and shape of the decoupling window may be set as needed, which facilitates targeted adjustment of the performance of the power divider.

As used herein, the words "front", "rear", "top", "bottom", "above", "below", etc., if present, are used for descriptive purposes and are not necessarily used to describe constant relative positions. It should be understood that the terms used in this way are interchangeable under appropriate circumstances, so that the embodiments of the present disclosure described herein, for example, can be operated on other orientations that differ from those orientations shown herein or otherwise described.

As used herein, the word "exemplary" means "serving as an example, instance, or illustration" rather than as a "model" to be copied exactly. Any realization method described exemplarily herein is not necessarily interpreted as being preferable or advantageous over other realization methods. Furthermore, the present disclosure is not limited by any expressed or implied theory given in the above technical field, background art, summary of the invention or embodiments.

As used herein, the word "basically" means any minor changes including those caused by design or manufacturing defects, device or component tolerances, environmental influences, and/or other factors. The word "basically" also allows the gap from the perfect or ideal situation due to parasitic effects, noise, and other practical considerations that may be present in the actual realization.

In addition, the above description may have mentioned elements or nodes or features that are "connected" or "coupled" together. As used herein, unless explicitly stated otherwise, "connect" means that an element/node/feature is electrically, mechanically, logically, or in other manners connected (or communicated) with another element/node/feature. Similarly, unless explicitly stated otherwise, "coupled" means that one element/node/feature can be mechanically, electrically, logically or otherwise connected with another element/node/feature in a direct or indirect manner to allow interaction, even though the two features may not be directly connected. That is, "coupled" is intended to comprise direct and indirect connection of components or other features, including connection using one or a plurality of intermediate components.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be noted that, as used herein, the words "include/comprise", "contain", "have", and any other variations indicate that the mentioned features, entireties, steps, operations, elements and/or components are present, but do not exclude the presence or addition of one or a plurality of other features, entireties, steps, operations, elements, components and/or combinations thereof.

In the present disclosure, the term "provide" is used in a broad sense to cover all ways of obtaining an object, so "providing an object" includes but is not limited to "purchase", "preparation/manufacturing", "arrangement/setting", "installation/assembly", and/or "order" of the object, etc.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include a plurality of instances of specific operations, and the order of operations may be changed in various other embodiments. However, other modifications, changes and substitutions are also possible. Therefore, the Specification and attached drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

That which is claimed is:

1. A power divider, comprising:
   a dielectric substrate;
   a transmission line circuit on a first surface of the dielectric substrate, the transmission line circuit including an input trace, a first output trace and a second output trace that extend along the first surface of the dielectric substrate, where the transmission line circuit is configured to split a signal received at the input trace into a first sub-component that is output on the first output trace and a second sub-component that is output on the second output trace; and
   a reference potential layer on a second surface opposite the first surface of the dielectric substrate, where the reference potential layer is provided with a decoupling window that exposes a part of the second surface of the dielectric substrate and is configured to reduce coupling in the transmission line circuit.

2. The power divider according to claim 1, wherein the decoupling window is configured to induce inductive coupling in the transmission line circuit to compensate for capacitive coupling in the transmission line circuit.

3. The power divider according to claim 1, wherein the decoupling window overlaps at least one of the input trace, the first output trace and the second output trace in a direction perpendicular to the first surface of the dielectric substrate.

4. The power divider according to claim 1, wherein a first section of the first output trace extends in parallel to one of a second section of the input trace and a third section of the second output trace, and wherein the decoupling window overlaps at least one of the first section, the second section and the third section.

5. The power divider according to claim 1, wherein the input trace, the first output trace and the second output trace are parallel to each other.

6. The power divider according to claim 5, wherein the decoupling window overlaps opposed sides of a middle one of the input trace, the first output trace and the second output trace.

7. The power divider according to claim 5, wherein the input trace is between the first output trace and the second output trace.

8. The power divider according to claim 1, wherein two among the input trace, the first output trace and the second output trace are collinear.

9. A base station antenna, wherein the base station antenna includes a power divider according to claim 1.

10. A power divider, comprising: a dielectric substrate having a first surface and a second surface opposite the first surface; a transmission line that includes first through third traces on the first surface of the dielectric substrate, where two of the first through third traces are arranged in side-by-side fashion with a first portion of the dielectric substrate exposed between the first and second traces; and a metal ground layer on the second surface of the dielectric substrate, the metal ground layer including a window that exposes a part of the second surface of the dielectric substrate, where the window overlaps the first portion of the dielectric substrate in a direction perpendicular to the first surface of the dielectric substrate.

11. The power divider according to claim 10, wherein the window does not overlap the second trace or the third trace.

12. The power divider according to claim 10, wherein the first and second traces each extend in a first direction and are spaced apart from each other in a second direction that is perpendicular to the first direction, and wherein the window only overlaps a portion of the first trace in the second direction.

13. The power divider according to claim 10, wherein the window is a decoupling window that reduces coupling between the first trace and the second trace.

14. The power divider according to claim 10, wherein the third trace is collinear with one of the first trace and the second trace.

15. The power divider according to claim 10, wherein the first trace is an input trace, the second trace is a first output trace, and the third trace is a second output trace, or the first trace is a first output trace, the second trace is a second output trace and the third trace is an input trace.

16. The power divider according to claim 1, wherein the decoupling window comprises an opening in the reference potential layer that exposes a region of the second surface of the dielectric substrate that has a same area as the decoupling window.

17. The power divider according to claim 10, wherein the window comprises an opening in the metal ground layer that exposes a region of the second surface of the dielectric substrate that has a same area as the window.

18. A power divider, comprising:
    a dielectric substrate having a first surface and a second surface opposite the first surface;
    a transmission line that includes first through third traces on the first surface of the dielectric substrate, where two of the first through third traces are arranged in side-by-side fashion with a first portion of the dielectric substrate exposed between the first and second traces; and
    a metal ground layer on the second surface of the dielectric substrate, the metal ground layer including a window that exposes a part of the dielectric substrate, where the window overlaps the first trace in a direction perpendicular to the first surface of the dielectric substrate.

19. The power divider of claim 18, wherein the window overlaps the first portion of the dielectric substrate in the direction perpendicular to the first surface of the dielectric substrate.

20. The power divider according to claim 19, wherein the window comprises an opening in the metal ground layer that exposes a region of the second surface of the dielectric substrate that has a same area as the window.

* * * * *